US010584728B2

(12) United States Patent
Maris (10) Patent No.: US 10,584,728 B2
(45) Date of Patent: Mar. 10, 2020

(54) MECHANICAL TUBULAR ELEMENTS CONNECTION SYSTEM AND METHOD OF CONNECTING A FIRST AND SECOND TUBULAR ELEMENT OF SUCH A TUBULAR ELEMENTS CONNECTION SYSTEM

(71) Applicant: Topclamp B.V., Rotterdam (NL)

(72) Inventor: Adriaan Willem Huibert Maris, Rotterdam (NL)

(73) Assignee: TOPCLAMP B.V., Rotterdam (NL)

( * ) Notice: Subject to any disclaimer, the term of this patent is extended or adjusted under 35 U.S.C. 154(b) by 630 days.

(21) Appl. No.: 15/120,416

(22) PCT Filed: Feb. 19, 2015

(86) PCT No.: PCT/NL2015/050104
§ 371 (c)(1),
(2) Date: Aug. 19, 2016

(87) PCT Pub. No.: WO2015/126245
PCT Pub. Date: Aug. 27, 2015

(65) Prior Publication Data
US 2017/0009791 A1    Jan. 12, 2017

(30) Foreign Application Priority Data

Feb. 20, 2014    (NL) ...................................... 2012293

(51) Int. Cl.
*F16B 7/02*    (2006.01)
(52) U.S. Cl.
CPC .................................... *F16B 7/025* (2013.01)

(58) Field of Classification Search
CPC ........ F16B 7/025; F16B 7/0413; Y10T 403/55; Y10T 403/551; Y10T 403/553;
(Continued)

(56) References Cited

U.S. PATENT DOCUMENTS 693,159 A  *  2/1902  Rumbarger ............. F16B 2/065
                                                  403/290
2,214,177 A  *  9/1940  Raybould ............... F16B 7/025
                                                  174/21 JS
(Continued)

FOREIGN PATENT DOCUMENTS

DE    202009012601    1/2010
WO         92/21886   12/1992

*Primary Examiner* — Michael P Ferguson
(74) *Attorney, Agent, or Firm* — Tutunjian & Bitetto, P.C.

(57) ABSTRACT

The present invention relates to a screw actuated mechanical tubular elements connection system to connect a first tubular element provided with a screw hole with a second tubular element via a connector assembly adapted to be inserted into the passages of the tubular elements. The connector assembly includes a rigid body with a foot portion, a movable gripping element, a movable screw actuated portion and a transmission between these movable elements. The tubulars connection system is operable such that upon actuation of the screw, in succession the gripping element exerts a pushing force perpendicular to the wall, to provide a gripping connection between the movable gripping element and the inner surface and an engagement between the foot portion and the opposed inner surface, and a pulling force to pull the second tubular element towards the first tubular element.

8 Claims, 8 Drawing Sheets

(58) Field of Classification Search
CPC .... Y10T 403/556; Y10T 403/557; F16L 1/09;
E21B 19/16; E21B 19/161
USPC ..... 403/292, 293, 294, 296; 405/184.4, 169,
405/170
See application file for complete search history.

(56) References Cited

U.S. PATENT DOCUMENTS

| | | | | |
|---|---|---|---|---|
| 3,441,253 | A * | 4/1969 | Blum | E04F 11/181 |
| | | | | 256/70 |
| 3,742,582 | A * | 7/1973 | Broske | B21D 39/04 |
| | | | | 228/107 |
| 4,146,341 | A * | 3/1979 | Smith | F16B 7/0453 |
| | | | | 403/174 |
| 4,344,718 | A * | 8/1982 | Taylor | E21B 17/046 |
| | | | | 403/286 |
| 4,344,719 | A * | 8/1982 | Thom | E04F 11/1817 |
| | | | | 403/297 |
| 4,540,307 | A * | 9/1985 | Hollaender, II | E04F 11/1817 |
| | | | | 403/190 |
| 5,059,057 | A * | 10/1991 | Graef | A61F 2/28 |
| | | | | 403/292 |
| 2007/0206989 | A1* | 9/2007 | Wagner | E04F 11/1836 |
| | | | | 403/297 |
| 2009/0087255 | A1* | 4/2009 | Jorna | F16B 7/0453 |
| | | | | 403/171 |

* cited by examiner

MECHANICAL TUBULAR ELEMENTS CONNECTION SYSTEM AND METHOD OF CONNECTING A FIRST AND SECOND TUBULAR ELEMENT OF SUCH A TUBULAR ELEMENTS CONNECTION SYSTEM

BACKGROUND

1. Technical Field

The present invention relates to a mechanical tubular elements connection system wherein use is made of a connector assembly, and a method of connecting a first and second tubular element of such a tubular elements connection system.

2. Description of Related Art

A method of connecting first and second tubular elements is to weld the elements together. However, welding deteriorates the properties, such as yield strength of the tubular elements. Therefore, a mechanical connection system is preferred.

Known mechanical tubular elements connection systems comprise first and second tubular elements and a connector assembly, adapted to connect the first and second tubular elements.

These systems are conventionally applied in building frames or structures, e.g. comprising hollow vertical tubular elements. Other applications include other structures from tubular elements, such as truck beds or trailers, or utility pole assemblies for lighting.

The aim of the present invention is to provide an improved tubular elements connection system and method, that is easy to produce and to operate, and provides a reliable and stable connection.

SUMMARY

This aim is accomplished by a mechanical tubular elements connection system according to the present invention, comprising
- an actuating screw provided with screw thread,
- a first tubular element having a wall with an outer and an inner surface defining a first passage and two opposed end faces, at a distance from the end face the wall of the first tubular element being provided with a screw hole in communication with the first passage, the screw hole being provided with screw thread matching the screw thread of the actuating screw and wherein the length of the actuating screw exceeds that of the wall of the first tubular element;
- a second tubular element comprising a wall with an outer and an inner surface defining second passage and two opposed end faces, the second tubular element having a cross-section essentially matching the cross-section of the first tubular element,
- a connector assembly being adapted to connect the first and second tubular elements, comprising a first half adapted to be inserted into the first passage, and a second half adapted to be inserted into the second passage, the connector assembly comprising in particular:
  - a rigid body comprising a foot portion extending over the first and second half, adapted to engage with the inner surface of the first and second tubular elements; and
  - a movable gripping element provided at the second half of the connector assembly, opposite the foot portion, being movable between a mounting position allowing the second half of the connector assembly to be inserted into the second passage, and an assembled position in which the gripping element grips the wall of the second tubular element, and exerts a pressing force against the wall of the second tubular element, resulting in a gripping connection between the movable gripping element and the inner surface and an engagement between the foot portion and the opposed inner surface, and to exert a pulling force in line with the walls of the tubular elements, to pull the second tubular element towards the first tubular element,
  - a movable screw actuated portion provided at the first half of the connector assembly, the screw actuated portion being movable with respect to the rigid body upon actuation by the actuating screw, between a mounting position in which the screw actuated portion is brought in line with the screw hole, and an assembled position;
  - a transmission provided between the gripping element and the screw actuated portion;
the tubulars connection system being operable such that the connector assembly is insertable into the first and second passages, and wherein the screw actuated portion is being actuated, so that in succession:
  - the gripping element exerts a pushing force perpendicular to the wall to provide a gripping connection between the movable gripping element and the inner surface and an engagement between the foot portion and the opposed inner surface,
  - the gripping element exerts a pulling force to pull the second tubular element towards the first tubular element.

In an embodiment, the connector assembly further comprises:
  - a movable stop ridge provided between the first and second half of the connector assembly, which in a mounting position provides a stop for both end faces of the first and second tubular elements to position the connector assembly in relation to the first and second tubular elements, and which in an assembled position is retracted inward into the first or second passage allowing the end faces of the first and second tubular elements to be in contact with each other,
wherein the movable screw actuated portion is provided at a distance from the stop ridge essentially corresponding to the distance between the end face and the screw hole, and wherein the transmission provided between the gripping element, the stop ridge, and the screw actuated portion;
and wherein the connector assembly is insertable into the first and second passages, and the stop ridge abuts the end faces of the first and second tubular elements,
and wherein after the screw actuated portion is being actuated, the stop ridge is moved to the retraced assembled position, prior to the gripping element exerting a pushing and a pulling force.

In an embodiment, the rigid body of the connector assembly further comprises an axial fixation portion provided in the first half of the connector assembly, adapted to engage with a fixation element, e.g. the actuating screw, to fixate the connector assembly and the first tubular element in axial direction, and wherein after axial fixation of the first half of the connector assembly and the first tubular element is accomplished the screw actuated portion is being actuated.

An advantage of a mechanical tubular elements connection system of the present invention is that the connection is mechanical and non-destructive, and hence, the connector assembly is re-usable for many times.

The first and second tubular elements to be connected are generally elongated poles, vertical columns, horizontal beams, cantilevers, etc. Advantageously, the tubular elements are made by extrusion. It is also conceivable that tubular elements have a reduced length and form a base component, a corner element or a small connection portion.

The tubular elements have a wall with an outer and an inner surface defining a passage and two opposed end faces. The cross-section of the internal passage, or lumen, is generally square or circular, but alternative cross-sections such as rectangular or oval cross-sections are also conceivable. According to the invention, the cross-section of the second tubular element essentially matches the cross-section of the first tubular element. It is conceivable that deviations occur as a result of tolerances occurring during manufacturing of the tubular elements.

The wall of a tubular element may comprise a smooth outer and inner surface, but it is also conceivable that ribs or screw thread is provided onto a surface. One or both of the surfaces of the tubular element may be treated, e.g. paint can be applied, or the surface may be anodized. It is an advantage of the present invention that no special treatment of the wall of the tubular element is required to provide an adequate connection with the connector assembly of the present invention. On the other hand, when the surface has been treated, this does not affect the operation of the mechanical tubular elements connection system of the invention.

The tubular elements may be made from many materials which are suitable for their intended application, e.g. steel, aluminum, plastics or other materials. Aluminum is popular because of its light weight and corrosion resistant qualities.

The mechanical tubular elements connection system of the invention comprises a first and second tubular element, and a connector assembly to connect the first and second tubular elements. For its operation, an actuating screw is provided, comprising screw thread. The wall of the first tubular element is provided with a screw hole with matching thread, at a distance from the end face. The screw hole extends from the outer surface to the inner surface, and hence the screw hole is in communication with the first passage. The length of the actuating screw exceeds that of the wall of the first tubular element, and as a results, it is allowed to enter the first passage.

In order to connect the first and second tubular elements, the connector assembly comprises a first half adapted to be inserted into the first passage, and a second half adapted to be inserted into the second passage. The first and second half may be of similar length, but it is also conceivable that the length of the first half exceeds the length of the second half, or vice versa. It is important that the length of the first and second half suffices to provide an adequate connection. To that end, the components of the connector assembly should be adequately able to contact the inner surfaces of the first and second tubular elements.

The connector assembly comprises in particular:
a rigid body,
a movable gripping element,
a movable screw actuated portion and
a transmission between the gripping element and actuated portion.

The rigid body and transmission extend over the first and second half, while the movable gripping element is provided at the second half and the screw actuated portion at the first half. Preferably, the overall cross-section of the connector assembly, in particular of the rigid body, substantially matches the cross-section of the tubular elements. With 'substantially match' it is meant that it is slightly smaller, to enable easy fitting of the connector assembly. However, advantageously, the cross-section is only smaller to a very small extent, and hence, the phrase 'substantially match' is used. This way, the connector assembly essentially fills the first and second passage, and thereby provides an improved strength.

Advantageously, the 'substantially matching' cross section of the connector assembly of the invention provides a reliable and stable connection, as its dimensions allow to compensate for the size tolerances of the first and second passages of the tubular elements. In the manufacturing process of tubular elements, a certain tolerance has to be admitted, to prevent adding considerable expense to the process. When the connector assembly is too small, the fit will be loose and a hinge effect will occur. This not only reduces the initial load capacity, but permits additional reductions in capacity if the tubular elements are fatigued with the motion as time passes. On the other hand, if the connector assembly is too large and is jammed into the passage, a shear problem may occur. In any event, the stretching of the tubular element by an oversized connector assembly will stress the tubular element, and may actually cause a rupture, hairline crack or the like.

The rigid body of the connector assembly comprises a foot portion and preferably also an axial fixation portion. Advantageously, the rigid body is of a one-part construction, made by extrusion. This is in particular advantageous in view of the reduced production costs.

The foot portion of the rigid body extends over the first and second half, and is adapted to engage with the inner surface of the first and second tubular elements. In particular, the foot portion is adapted to engage with a bottom surface of the tubular elements. The foot portion may be of a one-part construction, or comprise interconnected portions, in particular a first foot adapted to engage the first tubular element and a second foot adapted to engage the second tubular element. The foot portion may comprise a smooth or roughened surface to engage with the surfaces of the tubular elements. It is also conceivable that gripping elements are provided in the foot portion, gripping the surface of the tubular elements.

Advantageously, with tubular elements of a rectangular or square cross-section, the foot portion extends over the entire inner bottom surface of the tubular element, to provide optimized engagement of the tubular element and the connection element.

With tubular elements of a circular or oval cross-section, the foot portion advantageously comprises a curvature matching that of the cross-section. The foot portion extends of a segment of this circle or oval, the segment preferably between a quarter and a half.

The rigid body of the connector assembly preferably further comprises an axial fixation portion provided in the first half of the connector assembly, adapted to engage with a fixation element, to fixate the connector assembly and the first tubular element in axial direction. The fixation element can be a pin or a screw, and the axial fixation portion may be formed by an opening or hole. Alternatively, the axial fixation portion can also be formed by a ridge or protrusion, the dimension of which matching the pitch of the screw thread of a screw fixation element. The mechanical tubular elements connection system of the invention already comprises an actuating screw, and hence it is conceivable that this actuating screw also functions as the fixation element. Alternatively, it is also conceivable that a separate fixation element is provided.

In an embodiment, it is conceivable that the connector assembly comprises a further axial fixation portion in the second half of the connector assembly, adapted to engage with a further fixation element, to fixate the connector assembly and the second tubular element in axial direction.

The connector assembly preferably further comprises a movable gripping element, a movable stop ridge, a movable screw actuated portion and a transmission between the gripping element, stop ridge, and actuated portion.

The transmission can be formed by any type of mechanical transmission, provided it is actuable by the actuating screw and it is adapted to move the gripping element and in an embodiment also the stop ridge between the respective mounting position and assembled position thereof. The transmission can e.g. comprise a gear wheel assembly, transmission belt, chain drive, crankshaft, lever assembly etc.

In an embodiment, the gripping element, stop ridge, actuated portion and transmission formed by a single movable lever element, preferably made by extrusion. Hence, in an embodiment all elements of the connector assembly can be made by extrusion, which is advantageous in view of production costs. The movable lever element advantageously rests on a fulcrum provided by the rigid body.

In an embodiment, the rigid body further comprises a spring member engaging with the second arm of the lever, providing a spring force to the lever which prior to engagement of the actuating screw prevents a free-pivotal motion of the lever over the fulcrum and positions the stop ridge in the mounting position.

The movable gripping element of the connector assembly is according to the invention provided at the second half of the connector assembly, opposite the foot portion. When forming part of the movable lever element, the gripping element is preferably provided on the second arm. The gripping element of the invention is movable between a mounting position, allowing the second half of the connector assembly to be inserted and fit into the second passage, and an assembled position, in which the gripping element grips the wall of the second tubular element, opposite the foot portion. With tubular elements of a rectangular or square cross-section, the foot portion extends over the inner bottom surface of the tubular element and hence, the gripping element grips the wall at the inner upper surface of the tubular element. Advantageously, the gripping element extends over a substantial part of the width of the upper surface, to optimize contact.

In the assembled position the gripping element grips the wall of the second tubular element, and exerts both a pressing force against the wall of the second tubular element, resulting in a gripping connection between the movable gripping element and the inner surface and an engagement between the foot portion and the opposed inner surface, and a pulling force in line with the walls of the tubular elements, to pull the second tubular element towards the first tubular element. This combined exertion of forces is advantageously accomplished by the combination of transmission and configuration of the gripping element. The operation will be explained later.

In an embodiment, the gripping element comprises a leaf spring attributing to exert the pulling force to pull the second tubular element towards the first tubular element. The leaf spring preferably extends perpendicular to the longitudinal axis of the tubular elements.

In an embodiment, the connector assembly further comprises a movable stop ridge, provided between the first and second half of the connector assembly. The movable stop ridge is movable between a mounting position, in which it provides a stop for both end faces of the first and second tubular elements, to position the connector assembly in relation to the first and second tubular elements, and an assembled position, in which the stop ridge is retracted inward into the first or second passage allowing the end faces of the first and second tubular elements to be in contact with each other and abut each other. When forming part of the movable lever element, the stop ridge is preferably positioned centrally on the lever element. The width of the stop ridge is preferably small, in the order of 0, 1-1 mm. The length of the stop ridge is preferably significant: with tubular elements of a rectangular or square cross-section, the length of the stop ridge essentially matches the width of the top surface of the tubular elements. With tubular elements of a circular or oval cross-section, stop ridge advantageously comprises a curvature matching that of the cross-section, and extends of a segment of this circle or oval, the segment preferably between a quarter and a half.

The connector assembly further comprises a movable screw actuated portion, provided at the first half of the connector assembly. In an embodiment, the portion is provided at a distance from the stop ridge essentially corresponding to the distance between the end face and the screw hole. This is important as for the operation of the tubulars connection system, the screw actuated portion of the connector assembly needs to be aligned with the screw hole of the first tubular element. When forming part of the movable lever element, the screw actuated portion is preferably positioned at the first arm of the lever element.

The screw actuated portion is movable with respect to the rigid body, upon actuation by the actuating screw, between a mounting position in which the screw actuated portion is brought in line with the screw hole, and an assembled position. In this assembled position, the screw actuated portion has, via the transmission, moved the gripping element and optionally the stop ridge to their assembled position, such that in the assembled position the first and second tubular element are connected to each other.

The tubulars connection system of the invention is operable such that the connector assembly is insertable into the first and second passages, and optionally the stop ridge is allowed to abut the end faces of the first and second tubular elements. Subsequently, axial fixation of the first half of the connector assembly and the first tubular element is optionally accomplished, and finally the screw actuated portion is being actuated. This results, in succession, in that:
optionally the stop ridge is moved to the retraced assembled position,
the gripping element exerts a pushing force perpendicular to the wall to provide a gripping connection between the movable gripping element and the inner surface and an engagement between the foot portion and the opposed inner surface, and
the gripping element exerts a pulling force to pull the second tubular element towards the first tubular element.

The stop ridge is optionally provided for accurately assembling the connector assembly into the first and second tubular elements. When this function is completed and all elements abut each other and are appropriately positioned, the stop ridge is allowed to retract into the first or second passage.

The gripping element exerts two forces. The pulling force, pulling the second tubular element towards the first tubular element, is optionally being counteracted by the axial fixation of the first tubular element. Hence, an adequate connection is achieved. The connection is further achieved by the pushing force perpendicular to the wall, providing a gripping connection between the gripping element and the inner surface, but also, at the opposed side, an engagement between the foot portion and the inner surface it engages.

The invention further relates to a method of connecting a first and second tubular element of a mechanical tubular elements connection system according to claim 1, comprising the steps of:
- inserting the first half of the connector assembly into the first passage,
- optionally aligning the screw actuated portion of the connector assembly with the screw hole of the first tubular element,
- inserting the connector assembly into the second passage,
- actuating the screw onto the screw actuated portion, so that in succession:
  - the gripping element exerts a pushing force perpendicular to the wall to provide a gripping connection between the movable gripping element and the inner surface and an engagement between the foot portion and the opposed inner surface, and
  - the gripping element exerts a pulling force to pull the second tubular element towards the first tubular element.

BRIEF DESCRIPTION OF THE DRAWINGS

The invention will be further elucidated in relation to the attached drawings, in which.

DETAILED DESCRIPTION

In FIGS. 1-6 a possible embodiment of a mechanical tubular elements connection system 100 according to the present invention is shown, in various views and various positions. In particular, FIGS. 1/3, 4A, 5 and 6 represent consecutive steps of the assembly process of tubular elements 101 and 102. Same parts are given same numerals.

Figure 1:
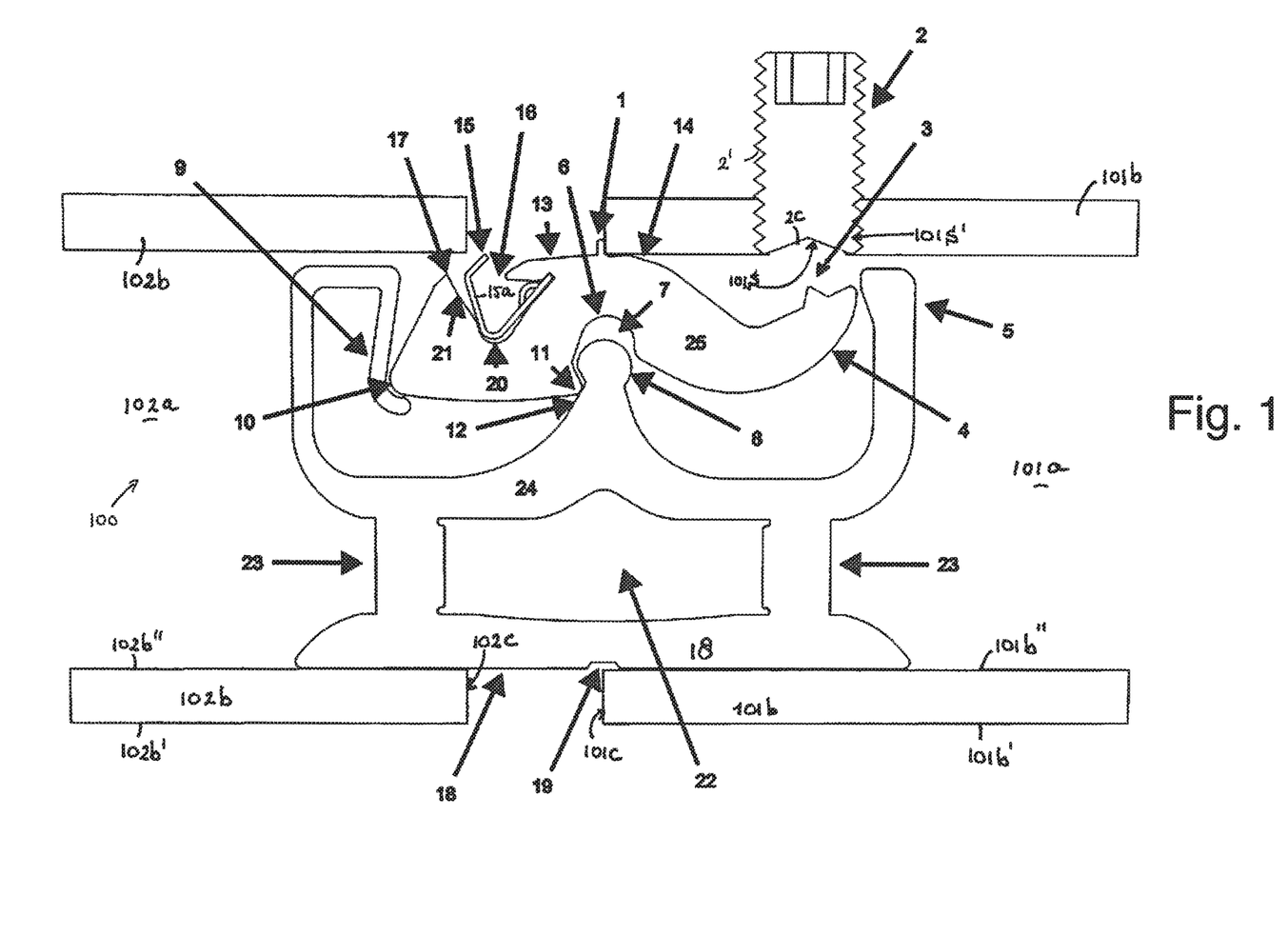
FIG. 1 represents a schematical side view of a mechanical tubular elements connection system of the invention in a first position, with a first embodiment of the connector assembly.
Figure 4A:
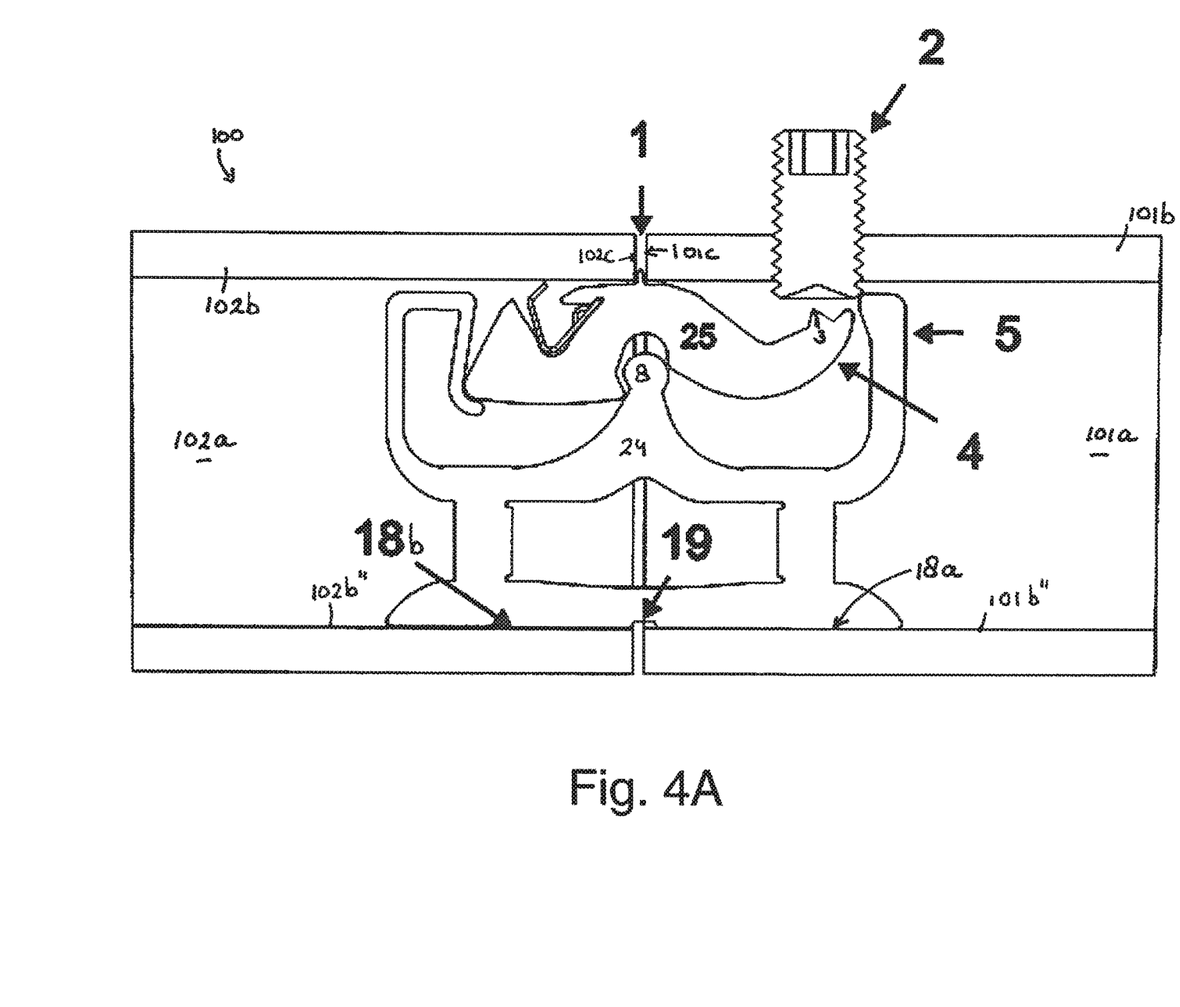
FIG. 4a represents a schematical side view of a mechanical tubular elements connection system of the invention in a third position.
Figure 4B:
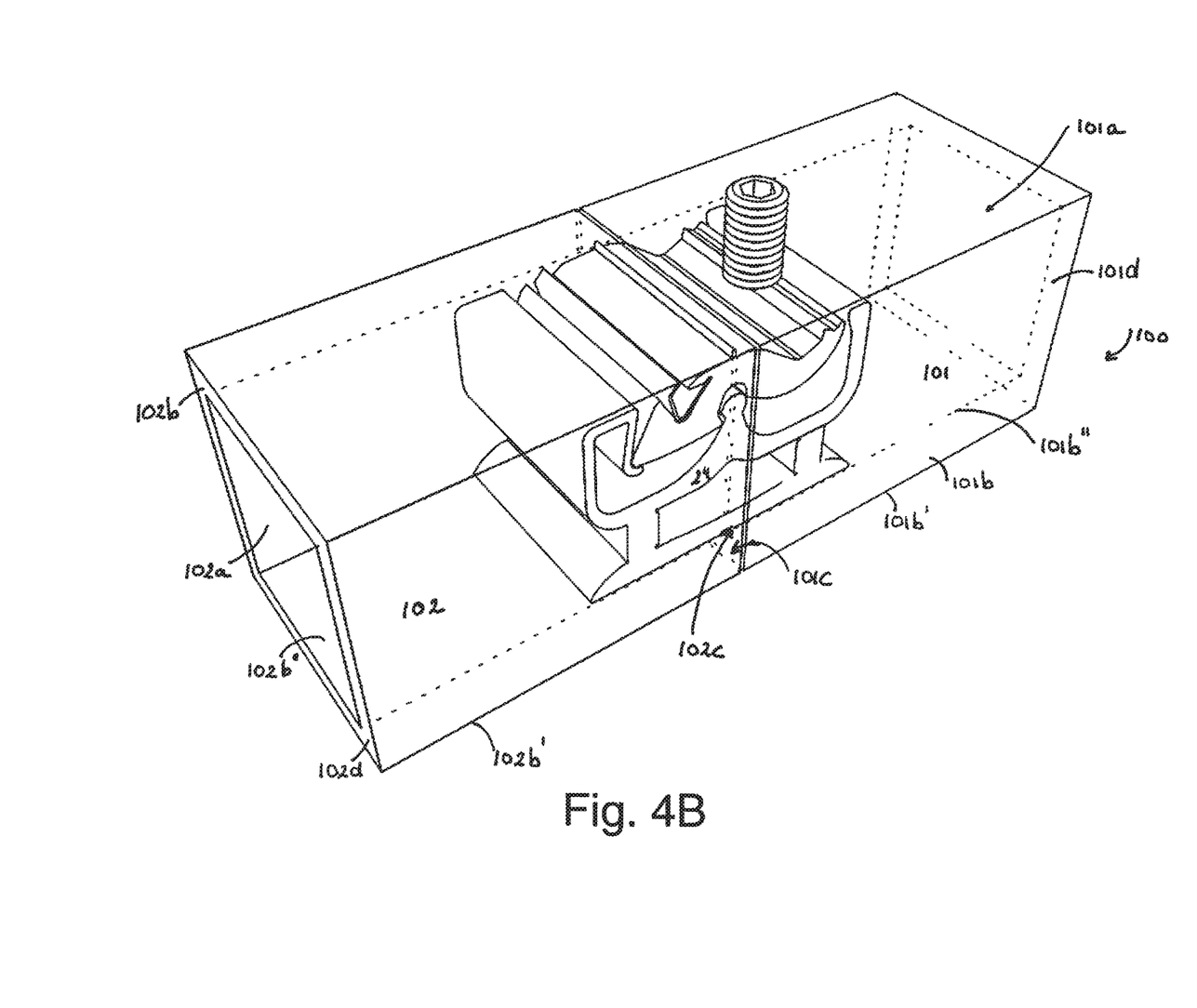
FIG. 4b represents a perspective view of the mechanical tubular elements connection system of the invention in the third position.

As indicated in FIG. 1 and in the perspective view of FIG. 4B, the first tubular element 101 has a wall 101b with an outer surface 101b40 and an inner surface 101b" defining a first passage 101a and two opposed end faces 101c and 101d. Second tubular element 102 comprises a wall 102b defining a second passage 102a and two opposed end faces 102c, 102d. The second tubular element 102 has an essentially square cross-section matching the cross-section of the first tubular element 101. It is noted that the invention is not restricted to tubular elements of a square cross-section: a rectangular, circular or oval cross-section is also conceivable, with a connector assembly having similar specifics according to the present invention.

At a distance from the end face 101c the wall 101b of the first tubular element 101 is provided with a screw hole 101s in communication with the first passage, the screw hole being provided with screw thread 101s'. The tubular elements connection system 100 comprises an actuating screw 2 provided with screw thread 2'. The screw thread 101s' of the screw hole 101s matches the screw thread 2' of the actuating screw 2. The length l of the actuating screw 2 exceeds that of the wall 101b of the first tubular element (see FIG. 3).

Figure 2:
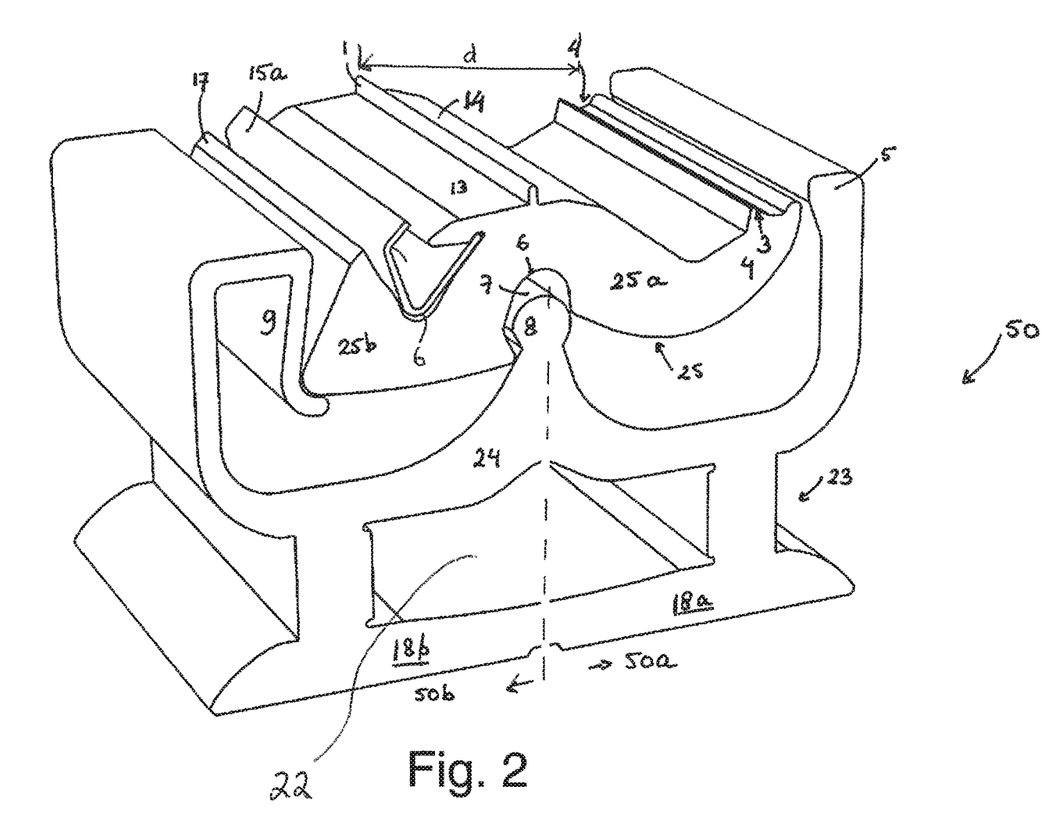
FIG. 2 represents a perspective view of the first embodiment of the connector assembly.
Figure 3:
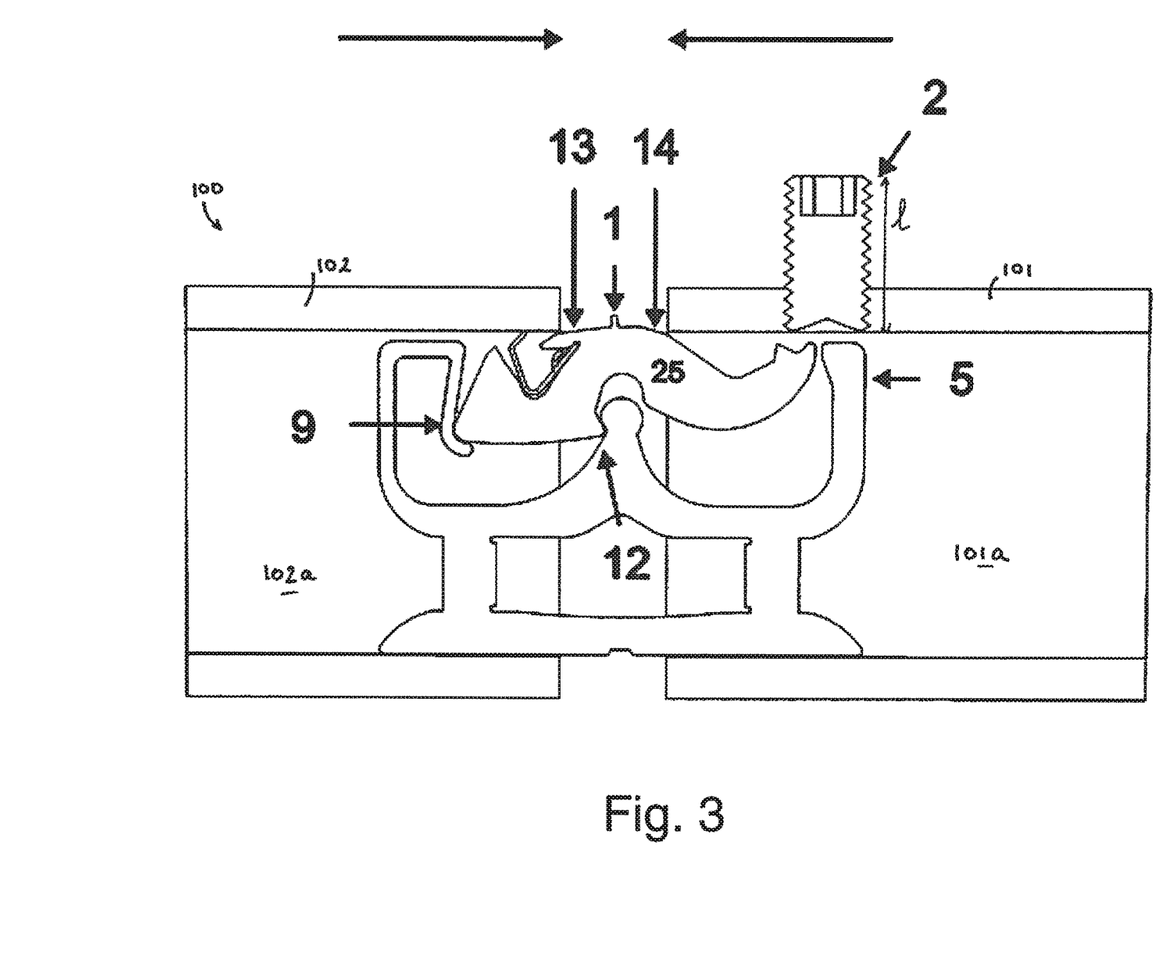
FIG. 3. represents a schematical side view of a mechanical tubular elements connection system of the invention in a second position.

The mechanical tubular elements connection system 100 further comprises a connector assembly 50, represented as a single element in perspective view in FIG. 2. The connector assembly of the invention is adapted to connect the first and second tubular elements 101a, 101b, as represented in the drawings. The connector assembly 50 comprises a first half 50a adapted to be inserted into the first passage 101a, and a second half 50b adapted to be inserted into the second passage 102a. This indicated in FIGS. 2 and 6.

The connector assembly 50 of the invention comprises a rigid body 24 with a foot portion 18, extending over the first and second half. In particular, as indicated in FIG. 4a, the foot portion comprises a first half foot portion 18a adapted to engage with the inner surface 101b" of the first tubular element 101, and a second half foot portion 18b, adapted to engage with the inner surface 102b" of the second tubular element 102. When the connector assembly is assembled into the tubular elements, the foot portion is pressed onto the inner surfaces of the tubular elements, to attribute to the connection between the tubular elements. The foot portion may be smooth or provided with a surface structure. In the shown embodiment with tubular elements with a square cross-section the foot portion 18 may comprise a flat plate-shaped bottom to engage with the inner surface. In case of a circular tubular element the bottom of the foot portion is rounded, with a curvature matching that of the tubular elements. In the shown embodiment, the foot portion 18 is provided with a recess 19, to provide space for roughnesses/irregularities such as wire edges at the end faces, created during machining of the tubular elements, and headings. The recess 19 ensures a stable contact surface between the foot portion and the inner surface of the tubular elements.

In the shown embodiment, the rigid body 25 furthermore comprises an axial fixation portion 5, here embodied as a ridge or flange, provided in the first half 50a of the connector assembly 50, which is adapted to engage with a fixation element, here the actuating screw 2, to fixate the connector assembly 50 and the first tubular element 101 in axial direction.

In the shown embodiment, passages 22 and 23 are provided inside and at the flanks of the rigid body, which may be provided to allow the passage of cables, e.g. electricity cables, or alternatively simply to reduce material, and consequently weight and costs. Not visible, but it is conceivable that passages are not only provided perpendicular to the longitudinal axis of the tubular elements, but also in line with the longitudinal axis of the tubular elements.

The connector assembly of the invention is furthermore provided with a movable gripping element 15 provided at the second half 50b of the connector assembly 50, opposite the second half foot portion 18b. The gripping element is movable between a mounting position, visible in FIG. 1, allowing the second half to be inserted into the second passage 102a, and an assembled position in which the gripping element grips the wall 102b of the second tubular element, as visible in FIG. 6.

Any configuration of the gripping element is possible, provided it is capable of exerting two functions according to the invention:
  to exert a pressing force, here directed upwardly, against the wall 102b of the second tubular element, resulting in a gripping connection between the movable gripping element and the inner surface 102b" and an engagement between the foot portion 18 and the opposed inner surface 102b", and
  to exert a pulling force, here directed sideward, to the right in the drawings, in line with the walls of the tubular elements, to pull the second tubular element towards the first tubular element.

Gripping element 15 in the shown embodiment comprises a leaf spring 15a, mounted in a recess 16. Leaf spring 15a is preferably made of a metal of significant hardness, to grip the inner surface 102b" of the wall 102b of the second tubular element. The hardness positively attributes to the gripping properties of the gripping element. Once additional pressure is exerted onto the gripping element, the gripping element will be fixed in place with respect to the second tubular element. The spring-shape guarantees the exertion of pressure and grip, also after optional deformation of a tubular element. The spring-shape furthermore provides a continuous axial pulling force, which is advantageous in situations of overload.

Advantageously, the leaf spring 15a comprises a curvature 15a', visible in FIG. 2. This curvature positively attributes to the pulling force exerted by the gripping element. Within the recess 16, space 20 is provided which is free space in FIG. 1, and occupied by the spring leaf 15a in FIG. 6. This space 20 is provided to allow the leaf spring 15a to perform a spring motion within said space and exert the forces according to the invention, and prevent plastic deformation of the leaf spring 15a. Advantageously, the spring leaf 15a is mounted such that it is replaceable when desired.

In the shown embodiment, gripping element 15 further comprises a crest 17, also adapted to grip the wall of the second tubular element and exert the forces of the gripping element. In addition, the crest 17 and adjacent slope 21 provide a stop surface for the leaf spring 15a.

The combination of leaf spring 15a and recess 16, and crest 17 and slope 21, provide a surplus value in performance in exerting both the pressing force and the pulling force.

In the shown embodiment, the connector assembly further comprises a movable stop ridge 1 provided between the first half 50a and the second half 50b of the connector assembly 50. In a mounting position, shown in FIGS. 1 and 4A and 4B, the stop ridge 1 provides a stop for both end faces 101c, 102c of the first and second tubular elements to position the connector assembly in relation to the first and second tubular elements. The movable stop ridge 1 is movable to an assembled position, shown in FIG. 5 and in particular in FIG. 6, in which the stop ridge 1 is retracted inward into the first passage 101a, allowing the end faces 101c, 102c of the first and second tubular elements to be in contact with each other, as visible in FIG. 6.

In the shown embodiment, the connector assembly 50 comprises adjacent stop ridge 1 a first half top surface 14 and a second half top surface 13. First half top surface 14 is adapted to be inserted into the first passage 101a, and is adapted to abut the inner surface 101b" opposite the surface engaged by the foot portion of the connector assembly 50.

Second half top surface 13 is adapted to be inserted into the second passage 10sa, and is adapted to abut the inner surface 101b" opposite the surface engaged by the foot portion of the connector assembly 50, adjacent the portion of the inner surface being gripped by the gripping element 15. Top surfaces 13 and 14 are movable together with the movable stop ridge 1. In the mounting position, the top surfaces 13 and 14 enable an easy mounting of the connector assembly into the passages of the tubular elements. Preferably, a light degree of jamming between the top surfaces and the inner surfaces of the tubular elements is possible, as a result of which the connector assembly can be mounted into the tubular elements without or with minimal play, whereby the tubular elements are accurately aligned. The light degree of jamming ensures the connector assembly to maintain to be positioned within the tubular elements, even prior to actuating the screw element to provide the actual connection between the tubular elements.

Figure 6:
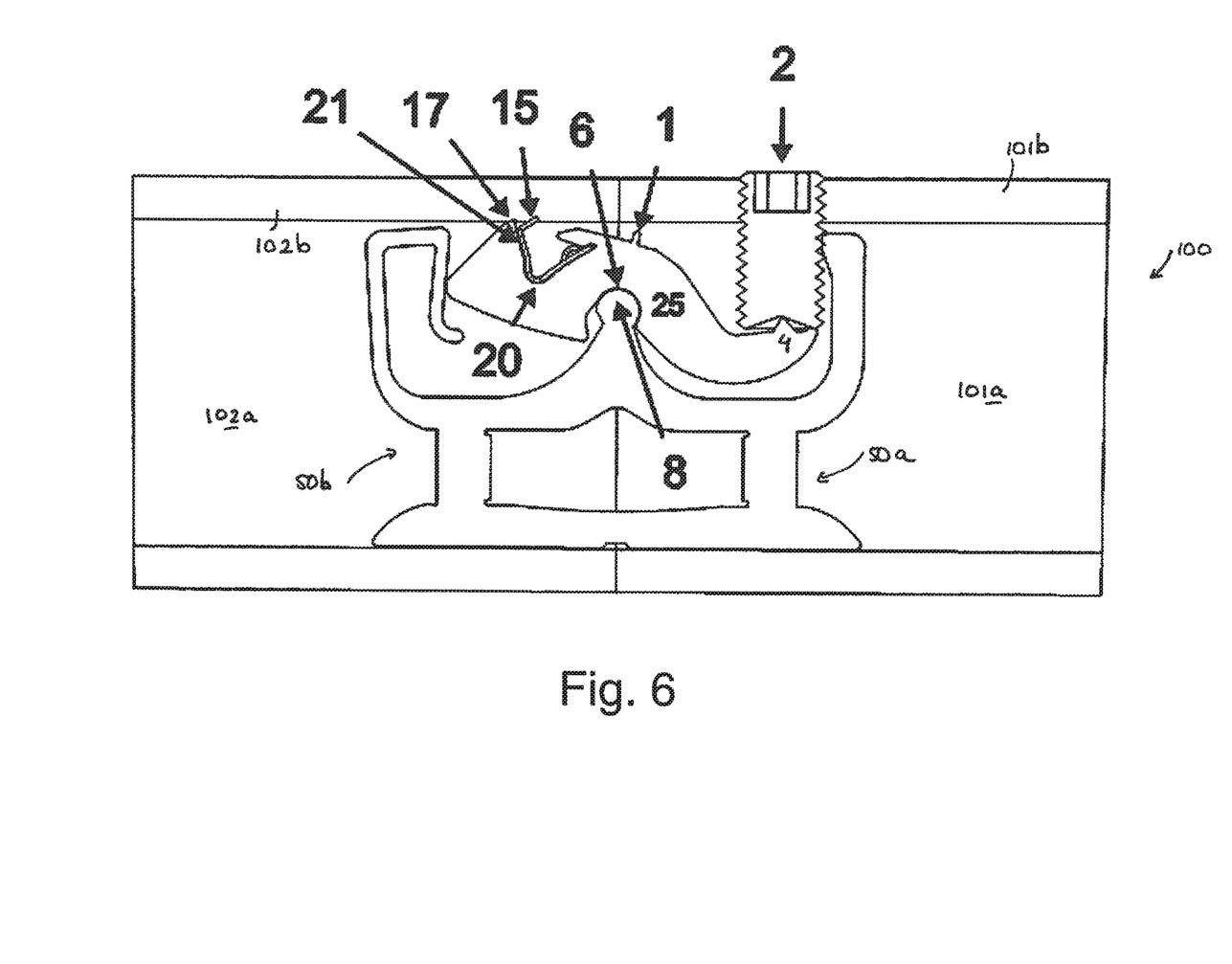
FIG. 6 represents a schematical side view of a mechanical tubular elements connection system of the invention in a fifth position.

The moveable stop ridge 1 of the shown embodiment ensures the alignment between the actuating screw 2 in the bore hole 101s and a movable screw actuated portion 4, provided at the first half 50a of the connector assembly 50. This screw actuated portion is provided at a distance d (visible in FIG. 2) from the stop ridge 1, which distanced essentially corresponds to the distance between the end face 101c and the screw hole 101s. The screw actuated portion 4 is movable with respect to the rigid body 24 upon actuation by the actuating screw 2, between a mounting position in which the screw actuated portion is brought in line with the screw hole, as shown in FIG. 1, and an assembled position, as shown in FIG. 6. In the shown embodiment, a centerpeak 3 is provided on the screw actuated portion to optimize contact with an actuating screw 2, provided centrally with a crater 2c.

In the shown embodiment, the screw actuated portion 4 is provided at one arm 25a of a lever element 25, forming a transmission between the gripping element 15, the stop ridge 1 and the screw actuated portion 4. The gripping element 15 is provided at the opposed arm 25b of lever element 25. It is noted that alternative transmissions are also conceivable, e.g. comprising multiple levers as indicated schematically in FIG. 7.

According to the invention, actuation of the screw 2 results in actuation of the screw actuated portion, here downward movement of the arm 25a of the lever element. Subsequently,
  optionally the stop ridge 1 is moved to the retraced assembled position as visible in FIG. 5, and
  the gripping element 15 exerts a pushing force perpendicular to the wall 102b to provide a gripping connection between the movable gripping element 15 and the inner surface 102b" and an engagement between the foot portion 18 and the opposed inner surface 102b", and
  the gripping element 15 exerts a pulling force to pull the second tubular element 102 towards the first tubular element 101.

Rigid body 24 comprises a fulcrum 8 for the movable lever element 25, and lever element 25 is provided with a socket 6 to engage with the fulcrum 8. In this embodiment, the rigid body 24 further comprising a spring member 9 engaging with ridge 10 of the second arm 25*b* of the lever element 25. The spring member 9, in combination with slope 12, provides a spring force to the lever. As a result, a free-pivotal motion of the lever over the fulcrum may be prevented, and the stop ridge may be maintained in the mounting position. Hence, a starting position, i.e., the mounting position of the lever element 25 is assured. In addition, it attributes to a jamming positioning of the second half of the connector assembly into the second tubular element.

The shown configuration of fulcrum 8 and lever element 25 comprises a few advantageous aspects.

There is a free space 7 provided between the socket 6 and the fulcrum 8, which allows vertical translation of the lever element 25 upon actuation by the screw 2 to allow the stop ridge 1 to freely move away from the end faces 101*c* and 102*c*, to retract into the passage 101*a* or 101*b*, here 101*a*. This allow the end faces 101*c* and 102*b* to be in abutting contact with each other, resulting in a seamless connection between the tubular elements. The free space 7 allows a variable fit in vertical direction, to compensate for deviations and tolerances of the tubular elements, which are common during the production of tubular elements. As a result, the connector assembly ensures a good fit, adequate positioning and sufficient jamming of the lever element 25 with respect to the inner surfaces of the tubular elements 101 and 102, and an adequate connection between the tubular elements and the connector assembly.

Furthermore, the design of the free space 7 results in a translatable pivot point of the lever element with respect to the rigid body. As a result, first a pushing force is exerted by the gripping member, perpendicular to the wall and later a pulling force, pulling the tubular elements towards each other. This also results in an advantageous position of the leaf spring 15*a* of an embodiment of the gripping element 15 with such a leaf spring 15*a*. The advantageously provided spring member 9 and the configuration of slope 12 of the rigid body 24 adjacent the fulcrum attribute to the adequate order of events. In particular, the slope 12 and the free space 7 enable a translation of the lever element 25, compensating for large pulling forces. When the pulling force is too large, the end faces 101*c* and 102*c* may not be properly aligned prior to completing the connection, resulting in a ridge/seam.

Lever element 25 comprises a ridge 11 adjacent the socket 6, engaging the rigid body 24 just below the fulcrum 8 at a slope 12. Ridge 11 attributes to the correct starting position of the lever element 25, wherein the movable gripping element, stop ridge and screw actuated portion are all in mounting position. Slope 12 also forms a translation guide for the ridge 11 once the pivoting movement of the lever element 25 is no longer possible, upon further actuation by the screw 2.

In operation, first the first half 50*a* of the connector assembly 50 is inserted into the passage 101*a* of the first tubular element 101, provided with screw hole 101*s* for actuating screw 2. Stop ridge 1 prevents the connector assembly 50 to be inserted into the passage 101*a* too far. This is shown in FIG. 1. Optionally, depending on the geometry of the passage, the screw actuated portion 4 of the connector assembly 50 has to be aligned with the screw hole 101*s* of the first tubular element 101. When the cross section of the first passage is square, and the connector assembly 50 has a matching cross section, alignment is not necessary. On the other hand, with a circular cross section, or when the width of the connector assembly is significantly smaller than that of the passage, alignment of the screw actuated portion and the screw hole is necessary.

Once the connector assembly is in its correct position in the first tubular element, the second tubular element 102 can be fitted over the connector assembly 50, until the stop ridge 1 abuts the end face 102*c* of the second tubular element. An intermediate position in shown in FIG. 3.

As visible in FIG. 2, prior to mounting the connector assembly 50 into the tubular elements, the spring member 9, in combination with slope 12, provides an upwardly directed spring force to the lever element 25. As a result, a free-pivotal motion of the lever over the fulcrum may be prevented, and the stop ridge may be maintained in the mounting position. Hence, a starting position, i.e. the mounting position of the lever element 25 is assured. In addition, it attributes to a jamming positioning of the connector assembly into the tubular elements.

In FIGS. 4A and 4B, the tubular elements 101 and 102 are positioned against the stop ridge 1, and the connector assembly is adequately positioned therein and therebetween. In particular:

- the fixation element 5 is positioned adjacent the screw hole 101*s* with the actuating screw 2, and thus the actuation screw 2 can engage the fixation element 5 of the first half of the connector assembly;
- the screw actuated portion 4 is positioned below the screw hole 101*s*, and can thus be actuated by the actuation screw 2;
- recess 19 is positioned above the end faces 101*c* and 102*c*, providing space for roughnesses/irregularities such as wire edges and headings, enabling a stable contact surface between the foot portion 189 of the connector assembly and the inner surface of the tubular elements 101*b*" and 102*b*"

Subsequently, the actuation screw may be operated. The stop ridge 1 and the fixation element 5 fixate the position of the connector assembly 50. Fixation element 5 also attributes to the correct positioning of the actuating screw 2 upon actuating the screw actuated portion 4.

Figure 5:
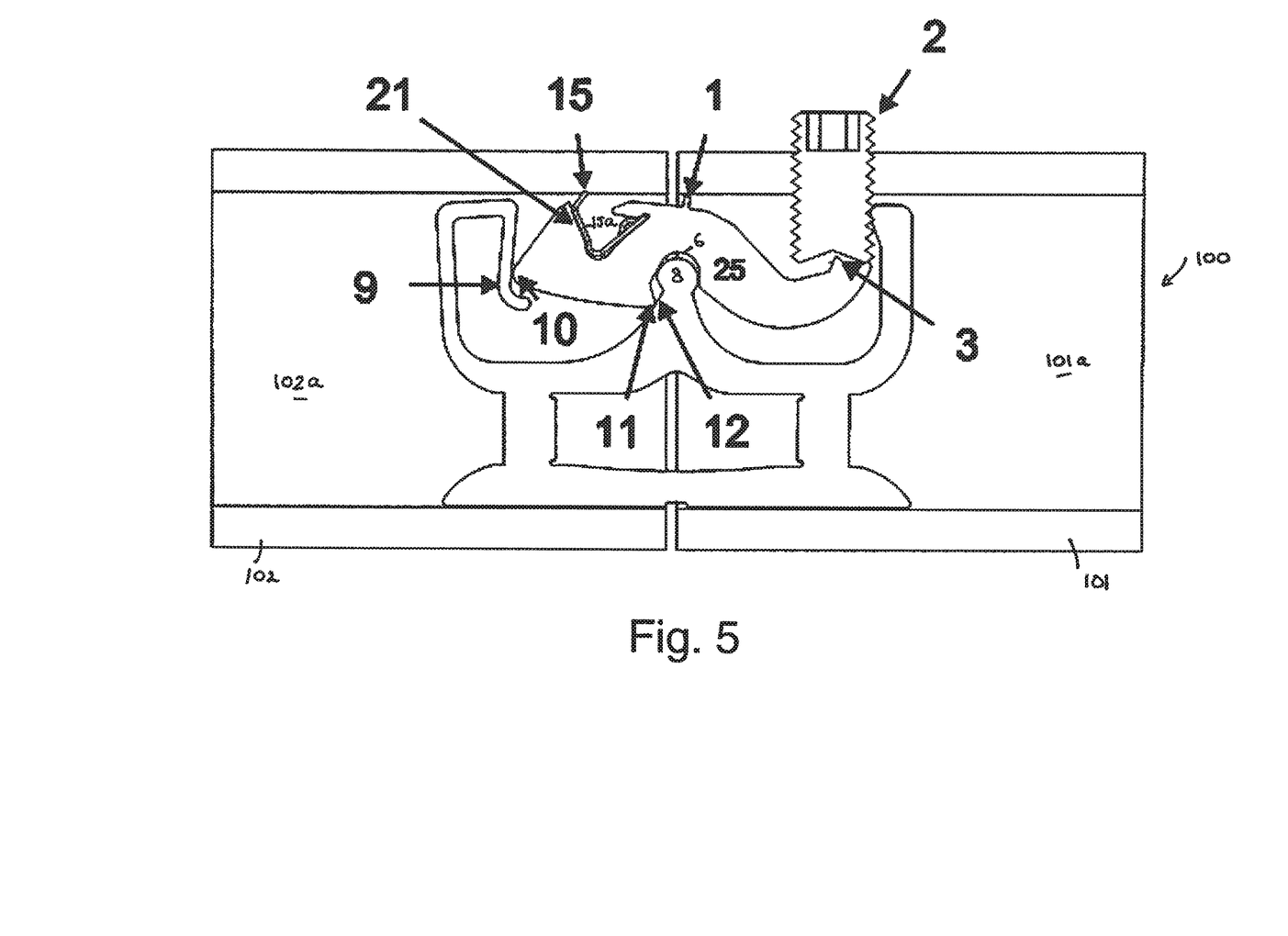
FIG. 5 represents a schematical side view of a mechanical tubular elements connection system of the invention in a fourth position.

In FIG. 5, the actuating screw 2 has been actuated to be in contact with the screw actuated portion 4, and consequently, the transmission, here lever element 25, has rotated about ridge 11 because of the jamming operation of the spring member 9 engaging with ridge 10 of the second arm 25*b*. The spring element 15*a* grips the second tubular element 102 and as a result, the tubular elements are brought in line and the lever element 25 is lowered. Consequently, the stop ridge 1 is allowed to lower from its mounting position to the retracted assembled position, in which it is retracted into the first passage 101*a*. Also, after lowering, the socket 6 is allowed to contact fulcrum 8. Vertical translation of the stop ridge 1 is enabled by compensation of the radial motion. This is accomplished by a translation of the ridge 11 over the slope 12 of the rigid body 24. As a result, stop ridge 1 cannot block against the tubular element, and centerpeak 3 cannot translate radially with respect to the actuating screw 2, and friction during actuating of the screw 2 is prevented. The free space 16 between the leaf spring 15*a* and the slope 21 prevents the grip from the leaf spring 15*a* to be excessive, which could prevent the tubular elements from being aligned prior to being pressed towards each other.

In the assembled position shown in FIG. 6, stop ridge 1 is positioned in the first passage 101*a*, leaf spring 15*a* grips the second tubular element and pushes it seamless towards the first tubular element. The fixation element 5 fixates the connector assembly with respect to the actuating screw 2. The socket 6 of the lever element 25 is pressed onto the fulcrum 8 of the rigid body 24. Upon further actuation of the actuating screw 2 onto the screw actuated portion 4 of the lever element 25, crest 17 is allowed to grip the inner surface 102*b*" at a radial angle, thereby exerting a pushing force perpendicular to the wall to provide a gripping connection between the movable gripping element and the inner surface, and an engagement between the foot portion and the opposed inner surface, and to exert a pulling force to pull the second tubular element towards the first tubular element. In addition to these forces, leaf spring 15*a* generates a moment also creating a combined pushing force perpendicular to the wall and a pulling force. To prevent the spring leaf 15*a* from being plastically deformed, a free space 20 is provided below the spring leaf 15*a*. As a result, the spring leaf can maintain its original shape and jamming force and will the spring leaf 15*a* be able to provide sufficient pushing and pulling force, even when plastic deformation occurs during prolonged load of the connection.

Figure 7:
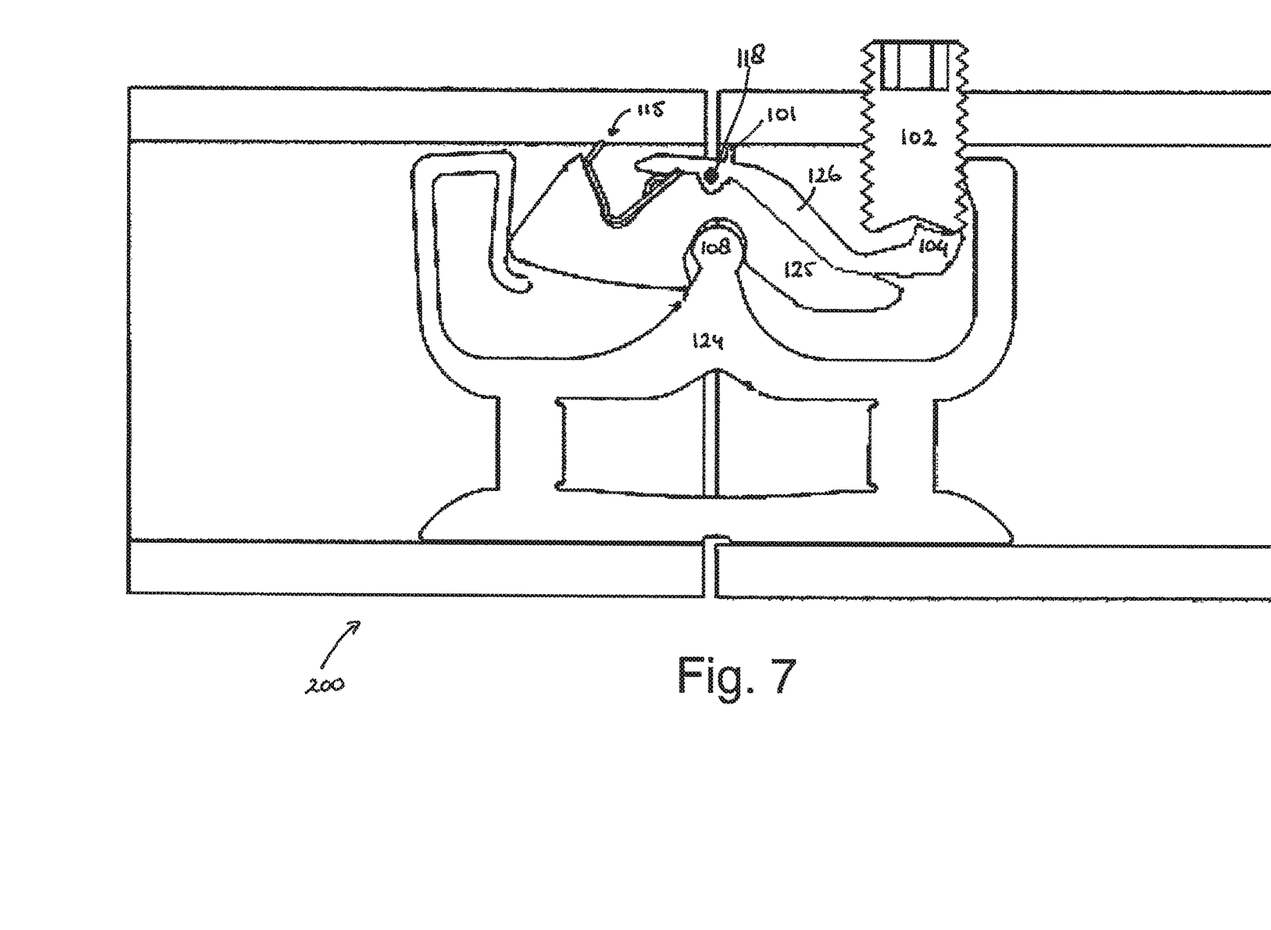
FIG. 7 represents a schematical side view of a mechanical tubular elements connection system of the invention in a third position, with a second embodiment of the connector assembly.

In FIG. 7, a mechanical tubular elements connection system 200 similar to that of FIGS. 1-6 is schematically depicted in a position similar to that shown in FIG. 5, comprising an alternative transmission. In this embodiment, the transmission provided between gripping element 115, stop ridge 101 and screw actuated portion 104 is formed by a second lever element 125, pivotable about fulcrum 108 of rigid body 124, and first lever element 126, pivotable about fulcrum 118 on the second lever element 125. Upon actuation by the actuating screw 102, first the first lever element 126 is allowed to pivot, and only upon further actuation by the actuating screw 102, also the second lever element 125 is being actuated and allowed to pivot about fulcrum 108.

The invention claimed is:

1. A mechanical tubular elements connection system, comprising:
   an actuating screw provided with a screw thread;
   a first tubular element having a wall with an outer surface and an inner surface defining a first passage and two opposed end faces, at a distance from the end face the wall of the first tubular element being provided with a screw hole extending therethrough in communication with the first passage, the screw hole being provided with screw thread matching the screw thread of the actuating screw and wherein the length (l) of the actuating screw exceeds that of the wall thickness of the first tubular element;
   a second tubular element comprising a wall with an outer surface and an inner surface defining a second passage and two opposed end faces, the second tubular element having a cross-section essentially matching the cross-section of the first tubular element;
   a connector assembly adapted to connect the first and second tubular elements, comprising a first half adapted to be inserted into the first passage, and a second half adapted to be inserted into the second passage, the connector assembly comprising:
   a rigid body comprising a foot portion extending over the first and second half, adapted to engage with the inner surfaces of the first and second tubular elements; and
   a movable gripping element provided at the second half of the connector assembly, opposite the foot portion, which is movable with respect to the rigid body between a mounting position allowing the second half of the connector assembly to be inserted into the second passage, and an assembled position in which the gripping element grips the wall of the second tubular element, and
   wherein the movable gripping element exerts a pressing force against the wall of the second tubular element, resulting in a gripping connection between the movable gripping element and the inner surface of the second tubular element and an engagement between the foot portion and the opposed inner surface, and
   wherein the movable gripping element exerts a pulling force in line with the walls of the tubular elements, to pull the second tubular element towards the first tubular element, the connector assembly further comprising:
   a movable screw actuated portion provided at the first half of the connector assembly, the screw actuated portion being movable with respect to the rigid body upon actuation by the actuating screw, between a mounting position in which the screw actuated portion is brought in line with the screw hole, and an assembled position in which the actuating screw applies a clamping force to the screw actuated portion;
   a transmission provided between the gripping element and the screw actuated portion, wherein the screw actuated portion and the transmission are formed by a single pivotable lever element comprising a first arm on which the screw actuated portion is provided and a second arm on which the gripping element is provided, and wherein the rigid body comprises a fulcrum opposite the foot portion on which the transmission is pivotably mounted;
   wherein the connector assembly is inserted into the first and second passages, and wherein the screw actuated portion is actuated to exert a clamping force on the screw actuated portion to pivot the lever element about the fulcrum and to engage the foot portion with the inner surface of the first tubular element, such that in succession:
   the gripping element exerts a pushing force perpendicular to the wall of the second tubular element to provide a gripping connection between the movable gripping element and the inner surface of the second tubular element and an engagement between the foot portion and the opposed inner surface, and
   the gripping element exerts a pulling force to pull the second tubular element towards the first tubular element.

2. The mechanical tubular elements connection system of claim 1, wherein an overall cross-section of the connector assembly substantially matches the cross-section of the tubular elements.

3. The mechanical tubular elements connection system of claim 1, wherein the rigid body of the connector assembly is made by extrusion.

4. The mechanical tubular elements connection system according to claim 1, wherein the gripping element comprises a spring member engaging with the second arm of the lever element.

5. The mechanical tubular elements connection system of claim 1, wherein the cross-section of the tubular elements is square, rectangular or circular.

6. The mechanical tubular elements connection system of claim 1, wherein the tubular elements are made by extrusion and the walls have smooth outer and inner surfaces.

7. The mechanical tubular elements connection system of claim 1, wherein the rigid body of the connector assembly further comprises an axial fixation portion provided in the first half of the connector assembly, adapted to engage with a fixation element to fixate the connector assembly and the first tubular element in axial direction, and wherein after axial fixation of the first half of the connector assembly and the first tubular element is accomplished the screw actuated portion is actuated.

8. The mechanical tubular elements connection system of claim 1, wherein the connector assembly further comprises:
   a movable stop ridge provided between the first and second half of the connector assembly, which in a mounting position forms a stop for both end faces of the first and second tubular elements to position the connector assembly in relation to the first and second tubular elements, and which in an assembled position is retracted inward into the first or second passage allowing the end faces of the first and second tubular elements to be in contact with each other,
   wherein the movable screw actuated portion is provided at a distance (d) from the stop ridge essentially corresponding to the distance between the end face and the screw hole, and wherein the transmission is provided between the gripping clement, the stop ridge, and the screw actuated portion; and
   wherein the connector assembly is insertable into the first and second passages, and the stop ridge abuts the end faces of the first and second tubular elements, and wherein after the screw actuated portion is actuated, the stop ridge is moved to the retraced assembled position, prior to the gripping element exerting a pushing and a pulling force.

* * * * *